United States Patent [19]
Koole

[11] Patent Number: 5,203,364
[45] Date of Patent: Apr. 20, 1993

[54] CANOPY JACK ASSEMBLY AND METHOD OF OPERATION

[76] Inventor: Arie Koole, 316 N. Meadow, Grangeville, Id. 83530

[21] Appl. No.: 855,854

[22] Filed: Mar. 20, 1992

[51] Int. Cl.[5] ............................................. B60P 3/34
[52] U.S. Cl. .................................... 135/111; 296/100; 135/88; 135/113
[58] Field of Search .......................... 296/100, 26, 27; 135/88, 111, 113; 52/66

[56] References Cited

U.S. PATENT DOCUMENTS

| | | | |
|---|---|---|---|
| 3,155,423 | 11/1964 | Cripe | 296/100 |
| 3,572,821 | 3/1971 | Antwerp | 296/137 |
| 3,649,073 | 3/1972 | Whittemore | 296/137 |
| 3,773,380 | 11/1973 | Stockdill | 296/137 |
| 3,897,100 | 7/1975 | Gardner | 296/10 |
| 3,901,548 | 8/1975 | Seaman, Jr. | 296/10 |
| 4,068,886 | 1/1978 | Gostomski | 296/137 |
| 4,101,162 | 7/1978 | Koehn | 296/137 |
| 4,562,786 | 1/1986 | Pruonto | 135/88 |
| 4,613,181 | 9/1986 | Rafi-Zadeh | 296/100 |
| 4,648,649 | 3/1987 | Beal | 296/164 |
| 4,673,209 | 6/1987 | Rafi-Zadeh | 296/100 |
| 4,693,508 | 9/1987 | Pettit | 296/100 |
| 4,756,571 | 7/1988 | Lake | 296/100 |
| 4,810,158 | 3/1989 | Bitzer | 414/498 |
| 4,856,841 | 8/1989 | Rafi-Zadeh | 296/100 |
| 4,964,669 | 10/1990 | Geier | 135/88 |
| 5,002,329 | 3/1991 | Rafi-Zadeh | 296/100 |
| 5,016,558 | 5/1991 | Oehler | 114/361 |
| 5,044,296 | 9/1991 | Pepper et al. | 135/88 X |
| 5,064,240 | 11/1991 | Kuss et al. | 296/100 |

*Primary Examiner*—Robert R. Song
*Attorney, Agent, or Firm*—Oblon, Spivak, McClelland, Maier & Neustadt

[57] ABSTRACT

An apparatus for retractably mounting a canopy on a bed of a pickup truck or other support and a method for operation of the apparatus. The apparatus includes bed rails mounted on top portions of side walls of the pickup, bottom rails mounted on said bed rails, top rails mounted to said bottom rails and a cover connected to the top rails. The method of elevating the canopy includes the steps of mounting the bed rails on side walls of the pickup, mounting bottom rails on the bed rails, mounting top rails on the bottom rails, mounting the canopy to the top rails, railing the bottom and top rails together toward a rear portion of the pickup truck, and lifting the combined top rails and canopy from the bottom rails such that the canopy is elevated from the pickup truck.

16 Claims, 6 Drawing Sheets

CANOPY JACK ASSEMBLY AND METHOD OF OPERATION

BACKGROUND OF THE INVENTION

1. Field of the Invention

The present invention is directed to a canopy jack assembly and method of operation wherein the assembly is designed to fit between any commercial canopy and a pickup bed or box, allowing the operator to lift the canopy above cab height and wherein, once the canopy has been lifted, the operator can rail the canopy toward the cab of the pickup so as to provide space to the rear of the raised canopy to haul items taller than the raised canopy as well as allowing access to items in the bed of the pickup truck for the operator.

BACKGROUND OF THE INVENTION

Retractable or liftable vehicle tops are known in the prior art and are characterized by U.S. Pat. No. 3,649,073 to Whittemore and U.S. Pat. No. 3,155,423 to Cripe. In the '073 patent, in order to protect items being carried in a vehicle opentopped compartment, such as a pickup truck bed, a trailer or a towed boat, against pilferage and weather, a close fitting cover is provided which utilizes a mechanism which permits translation of the cover between an upper, open position, and a lower, closed position. This mechanism includes mirror image components on each side of the vehicle for coupling the compartment and cover. The mechanism includes a first inverted "U" frame member pivotally secured at its lower ends to forward mounted brackets within the compartment and a second inverted "U" frame member disposed somewhat aft of the center of the compartment and pivotally secured at its lower ends to a second set of brackets Rollers arranged at the top of the inverted "U" frame members roll fore and aft in channels within the cover and provide vertical support for the cover. Fore and aft links are hingedly secured to the frame members at upper cross members thereof to constrain the legs of the frame members so as to remain parallel.

In the '423 patent, a liftable vehicle top is provided which is extendible and retractable for an otherwise open-top rear portion on the vehicle.

The foregoing structures require specially adapted vehicle tops. These and other known prior art covers which are applied to traditional open beds of pickup trucks are characterized as being unnecessarily complex and therefore difficult to manufacture. This, as a result, makes operational failure of the covers predictable. In addition, mechanisms of these types oftentimes are characterized by the further disadvantage of taking up an unacceptable amount of valuable space within the compartment to be covered.

SUMMARY OF THE INVENTION

It is therefore an object of the present invention to provide a canopy jack assembly and method of operation which avoids the drawbacks of the above-noted prior art.

A further object of the present invention is to provide a canopy jack assembly and method of operation wherein the assembly is designed to fit between any commercial canopy and a pickup bed or box, or for that matter any type of support, allowing the operator to lift the canopy above cab height. In accordance with the present invention, once the canopy has been lifted, the operator can then rail or push the canopy head toward and/or over the cab so as to provide space to the rear of the raised canopy to haul items that are taller than the raised canopy C itself, as illustrated in FIG. 1.

Naturally, items taller than the normal or lowered height of the canopy can also be hauled in the area under the canopy once it has been raised and railed or pushed ahead towards the cab. Once the canopy has been raised, access to items inside the pickup box can also be made from either side of the pickup instead of relying upon only rear access.

Another object of the present invention is to provide a lift assembly such that the canopy is designed to travel at highway speeds in a raised and locked position.

In accordance with the present invention, an apparatus is provided for retractably mounting a canopy or cover on the bed of a pickup truck, which includes bed rails mounted respectively on side walls of the pickup; bottom rails respectively mounted on the bed rails; top rails respectively pivotally mounted to the bed rails and positioned on top of the bottom rails; and a canopy or cover member connected to the top rail.

A method is also provided of elevating the canopy or cover of a pickup truck which includes mounting bed rails on side walls of the pickup; mounting bottom rails on the bed rails; mounting top rails on the bottom rails via lift arms; connecting the canopy to the top rails; railing the bottom and top rails together toward a rear portion of the pickup truck; and lifting the combined top rails and canopy from the bottom rails such that the canopy is elevated from the pickup truck.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 2:
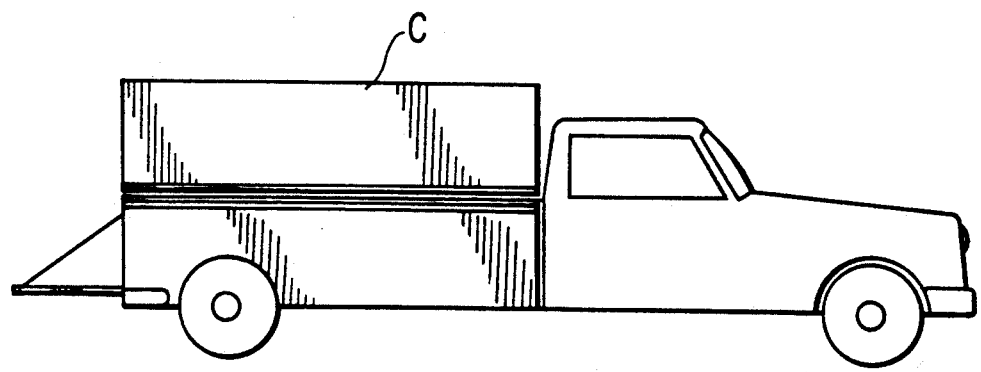
FIG. 2 illustrates the assembly in a lowered and locked position wherein the operator has opened the pickup tailgate.

Before explaining the specific elements and their mechanical relationships, further details of the manner in which the canopy jack assembly operates will be explained in connection with FIGS. 2-5, 8 and 9. The assembly is operated by five basic steps. First, the operator opens the pickup's tailgate T with the canopy C being positioned as shown in FIG. 2. Second, the operator releases a travel lock 21, and third, the operator pulls a manual lift bar 11 toward himself until bottom rails 2, 3 and top rails 4, 5 cease rearward movement together so as to move the canopy C back from the cab of the pickup and assume the position shown in FIG. 3. The fourth step requires the operator to lift the manual lift bar 11 and raise the top rails 4, 5 and canopy C to the position shown in FIG. 4 so as to be supported by a plurality of lifting arms 6. As can be readily understood, the base of the canopy C is bolted directly to the top rails 4, 5. The fifth step of operation requires the operator to push the lower rails 2, 3 ahead until they stop so that the canopy C and top rails 4,5 assume the position shown in FIG. 5. This is referred to as railing the assembly ahead.

With reference to FIGS. 7-12, it is noted that the canopy C physically attaches to the top rails 4, 5, which are interconnected by stabilizer bars 113, 114 and manual lifting bar 11. The combined rail guides and upper rail lock plates 9, as well as the bed rails 1, 1 are physically attached to the top of the pickup truck box sides and do not move.

The movable portion of the canopy jack assembly which the operator physically moves includes top rails 4, 5, bottom rails 2, 3 and lift arm 11. The top rails 4,5 and bottom rails 2,3 are physically attached together via pivotable lift arms 6, 6 which are, in turn, pivotally connected to bottom rails 2, 3. When the operator rails the assembly ahead or back, the top rails, bottom rails and lift arms all move in unison.

The liftable portion of the assembly is a top rail assembly which includes the top rails 4, 5 along with the lift arm member II and stabilizer bars 113, 114, stabilizer bar 114 being of variable length so as to allow for adjustment of the distance between top rails 4, 5. Correspondingly, stabilizer bars 13, 14 interconnect bottom rails 2, 3.

Figure 3:
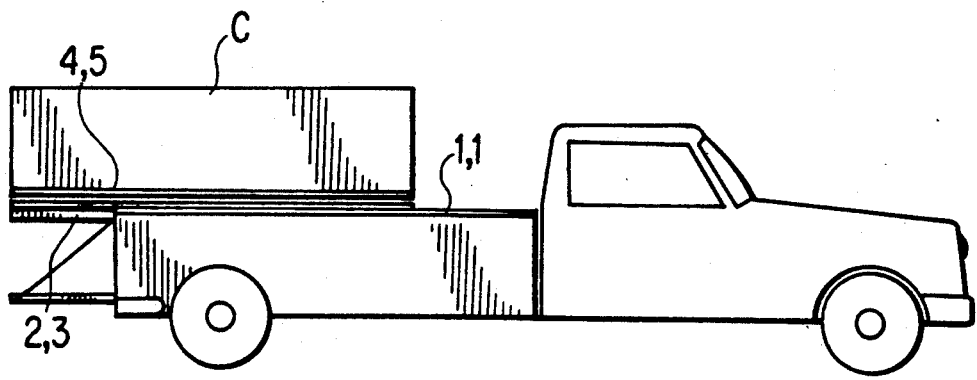
FIG. 3 shows the canopy and rail assembly after being railed rearwardly.

Railing the assembly ahead is accomplished by pushing the above-noted movable portion of the assembly, which carries the canopy C toward the pickup cab. FIG. 2 shows the canopy jack assembly in the down or closed position, railed all the way ahead. Railing the assembly back is accomplished by pulling the movable portion of the assembly toward the rear of the pickup and toward the operator who is standing at the rear of the pickup. FIG. 3 shows the assembly in the closed or down position and railed all the way to the rear of the bed of the pickup.

Figure 4:
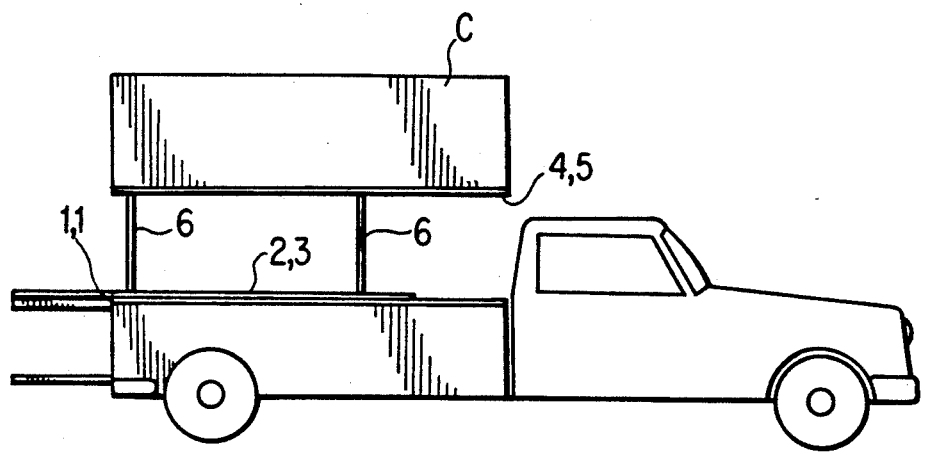
FIG. 4 shows the canopy and rail assembly after the canopy has been raised.
Figure 5:
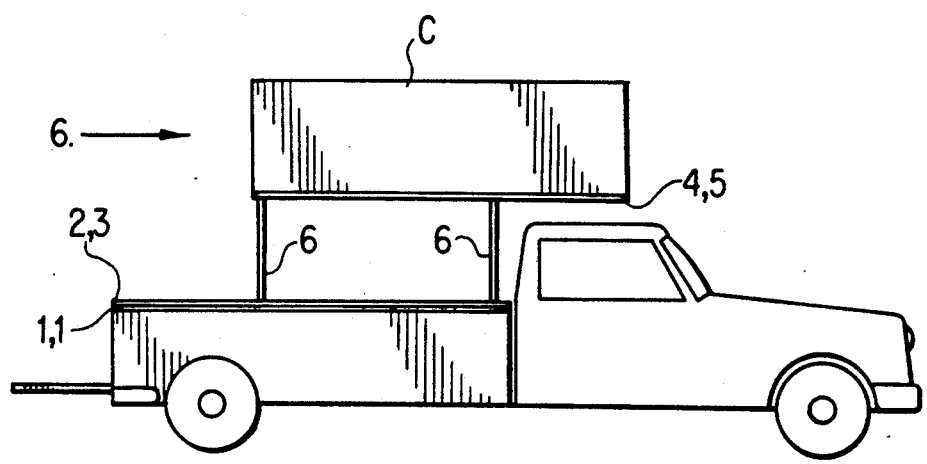
FIG. 5 shows the canopy and top rails partially positioned over the cab of the pickup after the former have been railed in a forward direction.
Figure 6:
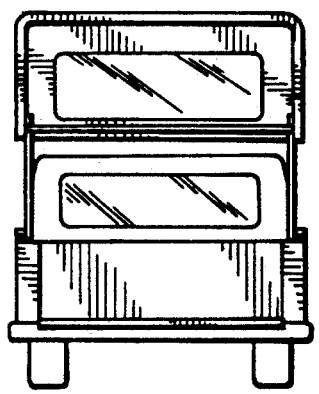
FIG. 6 is a view taken in the direction of arrow VI as shown in FIG. 5.

Raising or opening of the canopy allows the canopy to be held in its highest position by use of the canopy jack, as shown in FIGS. 4 or 5. Lowering or closing of the canopy allows the canopy to be positioned in its lowest position wherein the railing assembly is in the position shown in FIGS. 2 or 3.

Figure 7:
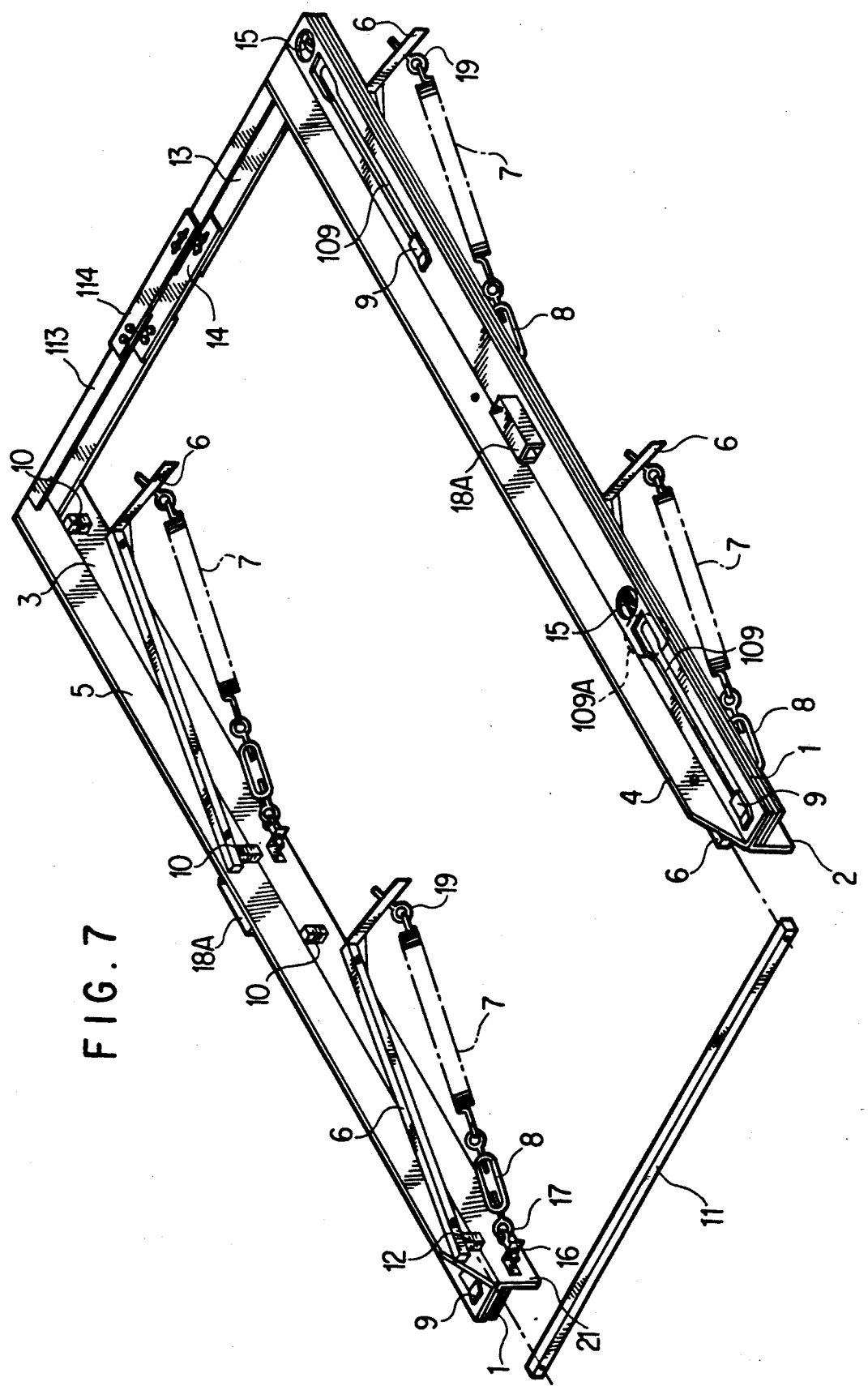
FIG. 7 shows the canopy jack assembly with the canopy removed and the top and bottom rails in a railed forward position.
Figure 8:
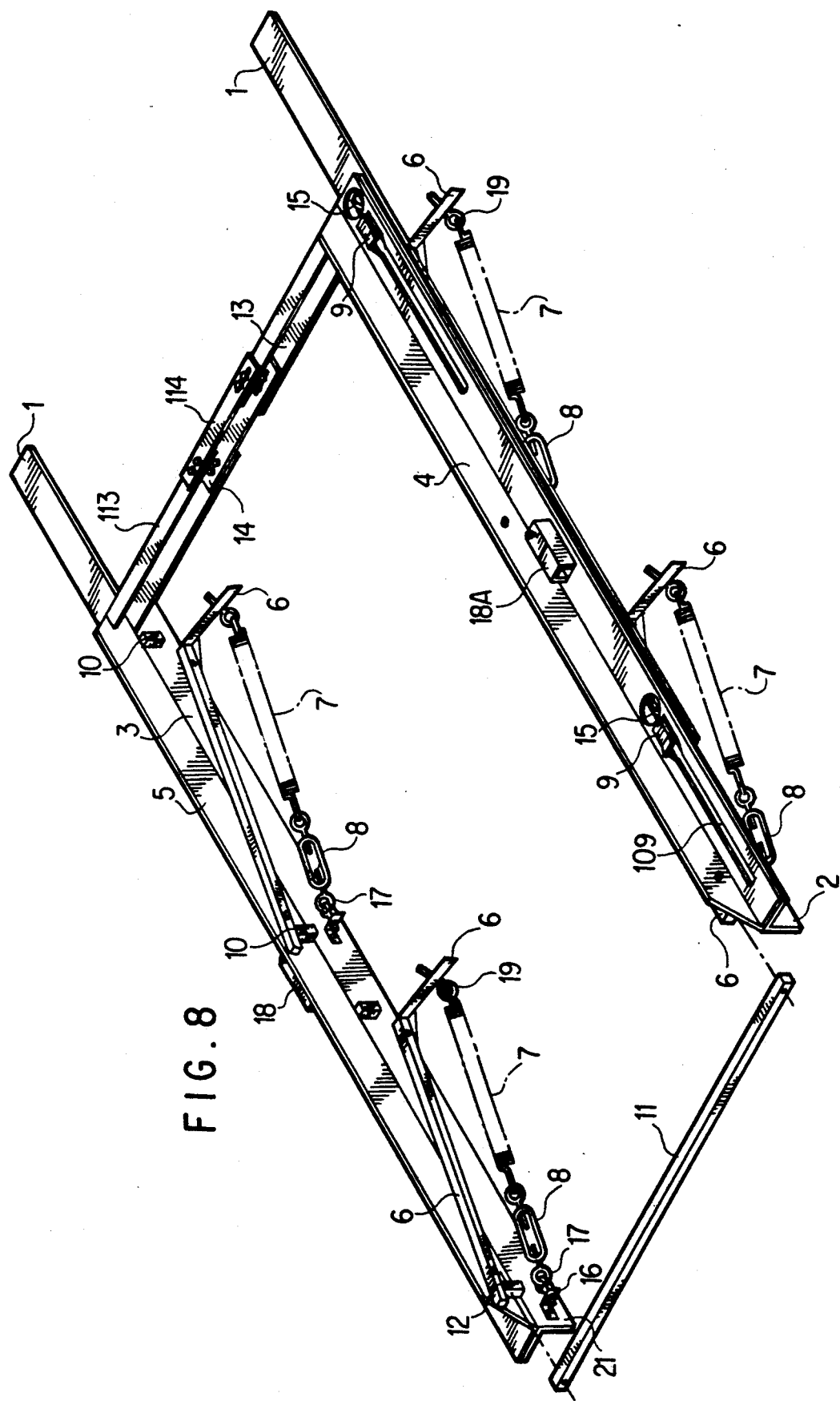
FIG. 8 is a view similar to that of FIG. 7 but wherein the top and bottom rails have been railed back with respect to the bed rails and the top rails are ready to be lifted.
Figure 9:
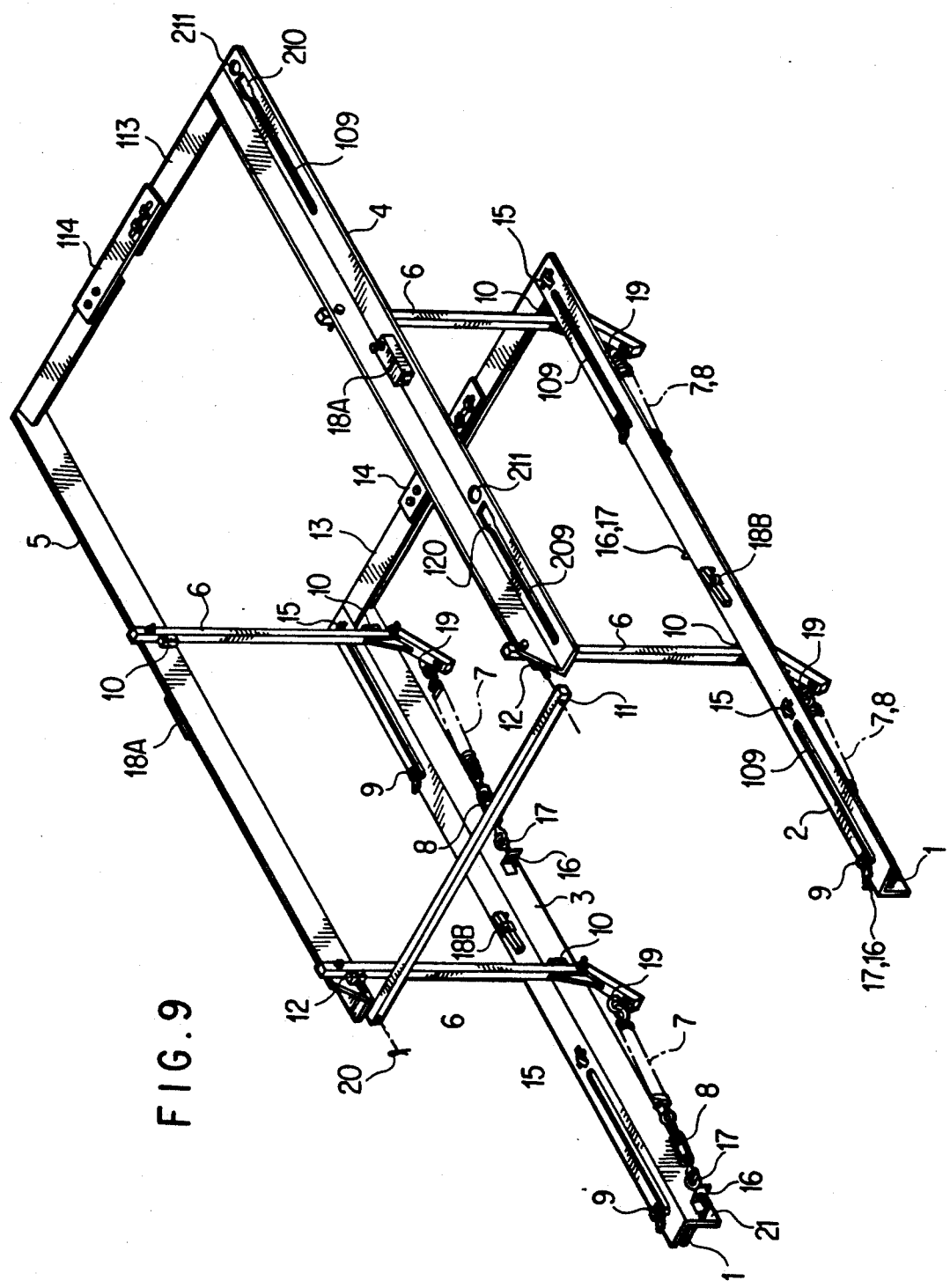
FIG. 9 shows the canopy jack assembly in a raised position.

FIGS. 7-9 illustrate loading springs 7 and tension adjustable turnbuckles 8. Reference number 9 indicates combined rail guides and upper rail lock plates while reference number 10 designates a stop member for the pivotable lifting arms 6. The manual lifting bar 11 interconnects top rails 4, 5. Also illustrated is a mounting stud plate 12 which is connectable to the manual lifting bar 11, a stabilizer bar 13 and adjustable stabilizer bar 14 which interconnect the bottom rails 2, 3, a rail roller assembly 15 by which the bottom rails 2, 3 roll on the bedrails 1, 1, anchor bracket 16 and eye-bolt anchor brackets 17. Reference number 18B (FIG. 9) represents a teeter-totter-type bottom rail lock assembly while reference number 19 represents an eye-bolt anchor. Lastly, a hitch pin cotter 20 and travel lock spring plunger 21, which is hand-retractable, as illustrated. Slots 109 are formed in bottom rails 2, 3 while corresponding slots 209 are formed in top rails 4, 5. Also provided is a lock plate relief 210 in top rails 4, 5 which are alignable with lock plates 9, 9, as shown in FIG. 8.

In describing in detail the operation of the canopy jack assembly of the present invention, it is best to start with a description of the structure in the lowered or closed, railed ahead position. This position corresponds to FIG. 2 and FIG. 7. In this position, the liftable portion of the top rail assembly is locked into place via the four locking plates which are attached to the top of the combined locking plates and guideposts 9. Because the locking plates are wider than the slots 209 machined into the top rails 4, 5, the top rails cannot be raised The guide posts of locking plates 9 allow, however, railing action of top rails 4,5 and bottom rails 2,3 due to their respective slots 209,109. Apertures 211 (FIG. 9) in top rails 3,4 are aligned at the rail rollers 15,15 in the position shown in FIG. 8.

Figure 10:
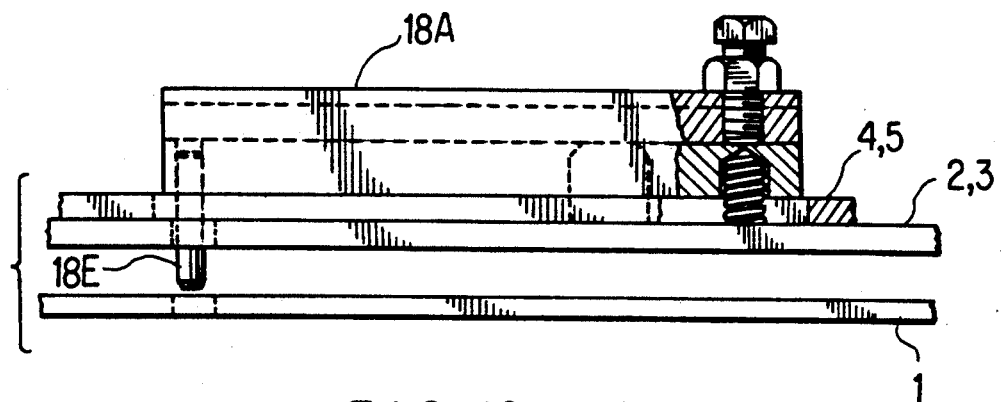
FIGS. 10, 11 and 12 show details of the rail locking mechanism.

It is important to note that in this position, the teeter-totter-type bottom rail lock assembly lock cover 18A serves to hold the bottom rail lock assembly 18B in the unlocked position as shown in FIG. 10 wherein the top rails 4,5 and bottom rails 2, 3 are free to be railed together with respect to bed rails 1, 1 Also in the position shown in FIG. 7, travel lock 21 is manually locked (i.e., the lock plunger passes through the bottom rail and into a hole, not shown, which has been drilled into the pickup box). The travel lock 21 prevents the movable portion of the rail assembly from railing back and ahead as the pickup accelerates or brakes, if the pickup is being used with the tailgate in the open position. With the tailgate in the closed position, the tailgate itself prevents the movable portion of the assembly from movement.

From the static position described above, the operator opens the pickup tailgate T, releases the travel lock 21, grabs hold of the manual lift bar 11, and then pulls or rails the assembly back toward himself or herself. As shown in FIG. 8, as the operator pulls, the top rail assembly with the attached canopy and the bottom rail assembly travel toward the operator who is standing at the rear of the pickup. The weight of the top rail assembly and bottom rail assembly are all carried by the four rail rollers 15. These rollers make the railing operation very easy and virtually free of friction. The rail assemblies continue moving until the front end edge of the bottom rail slots 109 are contacted with the corresponding combined guideposts and lock plates 9. At this physical point, the lock plate relief cutouts 210 of the top rails, as shown in FIG. 9, align with the combined guideposts and lock plates 9. Because the lock plate relief cutouts 210 are of a larger dimension than the lock plates 9, the top rails 4, 5 and canopy C can now be raised by pivoting action of lift arms 6, 6 and upward pushing of manual lifting bar 11.

As the operator lifts up on the manual lift bar 11, the force spring tension loaded arm 6 lifts the top rail assembly and attached canopy C. The fact that the tension of the lift springs 7 can be changed via the tension adjustable turnbuckles 8 make this assembly compatible for a wide range of canopy weights.

Figure 11:
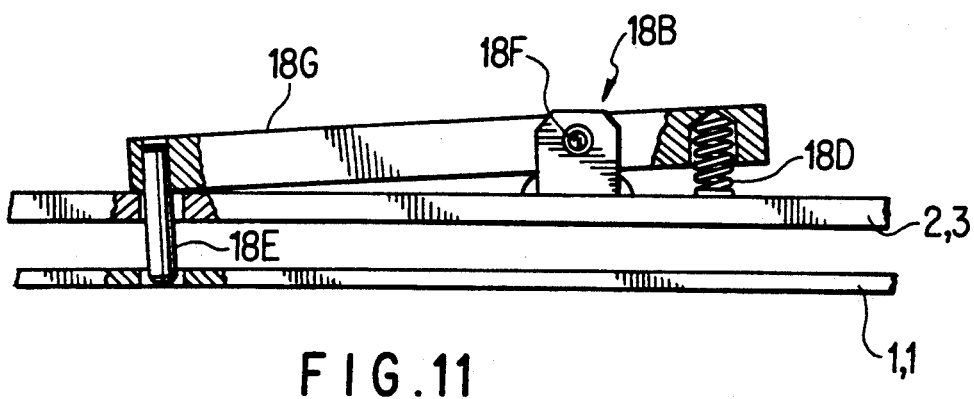
Figure 12:
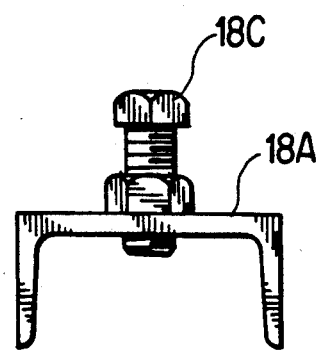

It is important to note that as soon as the top rail assembly starts to separate from the bottom rail assembly, the teeter-totter type lower rail locks 18B lock the position of bottom rails 2, 3 with respect to bed rails 1,1 as shown in FIG. 9 and 11. As shown in FIGS. 10–12, the lower rail locks 18B are disengaged by lock cover 18A in the rail position shown in FIG. 7. Rail lock cover 18A includes a lock engaging member 18C. Locks 18B are teeter-totter-type locks which include a spring 18D, a lock pin 18E, a pivot member 18F and a pivotable bar member 18G. In FIG. 10, bottom rails 2, 3 are unlocked from bed rails 1, 1 due to engagement of lock cover 18A, 18C with bar member 18G. In FIG. 11, bottom rails 2 and 3 are locked via lock pin 18E to prevent railing movement of bottom rails 2, 3 with respect to bed rails 1, 1. This prevents the bottom rail assembly from traveling ahead as the operator lifts the top rail assembly. This is especially critical if the pickup is parked and facing a downhill slope. If the bottom rails 2, 3 were otherwise permitted to roll ahead before the canopy C was fully raised, the canopy could crash into the pickup cab, preventing any further raising and causing damage to both the pickup and canopy. In the raised position, stops 10 engage lifting arms 6 to prevent the arms from being pivoted past a vertical orientation. FIG. 12 shows an end view of lock cover 18A.

Figure 1:
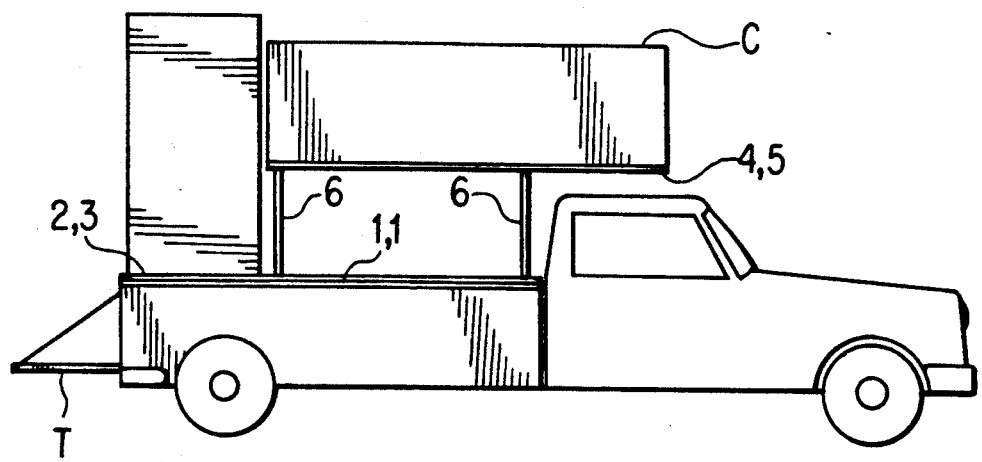
FIG. 1 shows the canopy jack assembly in a raised position so that tall loads can be loaded at a rear portion of the canopy and pickup bed.

At this point of operation, the operator can do one of two things. The operator can leave the canopy in the FIG. 4 position, allowing access to the sides of the pickup and its contents, the operator can stand upright under the canopy to organize items in the pickup, or the operator can haul tall items which fit under the canopy. The second choice would be to manually release the lower rail locks 18B and rail the assembly ahead so as to assume the position shown in FIG. 5 and manually engage travel locks 21. By doing this, the raised canopy C travels over the top of the pickup cab, this leaving an uncovered area at the rear of the pickup bed. In this position, items taller than the raised canopy can be hauled in the area behind the canopy as shown in FIG. 1. Simply reversing the process returns the canopy C to the original position shown in FIG. 2.

Obviously, numerous modifications and variations of the present invention are possible in light of the above teachings. It is therefore to be understood that within the scope of the appended claims, the invention may be practiced otherwise than a specifically described herein.

What is claimed as new and desired to be secured by Letters Patent of the United States is:

1. An apparatus for retractably mounting a canopy on a support, which comprises:
   first and second bed rails respectively mounted on the support;
   first and second bottom rails respectively slidably mounted on said bed rails;
   first and second top rails;
   a cover connected to said top rails; and
   means interconnecting said top rails and bottom rails for raising said top rails and canopy with respect to said bottom rails.

2. An apparatus as claimed in claim 1, wherein said means for raising said rails and canopy comprises guide means for respectively guiding railing motion of said bottom rails with respect to said bed rails.

3. An apparatus as claimed in claim 1, wherein said means interconnecting said top rails and bottom rails is respectively pivotally connected to said top rails and to said bottom rails.

4. An apparatus as claimed in claim 1, wherein said bed rails are mounted on the top portions of said side walls of said support.

5. An apparatus as claimed in claim 1, which comprises a lifting bar interconnecting adjacent end portions of said top rails.

6. An apparatus as claimed in claim 5, which comprises a stabilizer means interconnecting second adjacent ends of said top rails.

7. An apparatus as claimed in claim 1, which comprises a travel lock mechanism for respectively locking said bottom rails to said bed rails when said cover and top rails are in a lowered position.

8. An apparatus as claimed in claim 2, wherein said means for raising said top rails and canopy comprises arm members which are pivotally connected to said top rails and to said bottom rails.

9. An apparatus as claimed in claim 2, which comprises a lifting bar interconnecting first adjacent ends of said top rails.

10. An apparatus as claimed in claim 5, which comprises a stabilizer bar which interconnects second adjacent ends of said top rails.

11. An apparatus as claimed in claim 2, which comprises locking means for preventing railing of said bottom rails with respect to said bed rails when said cover and top rails are in a raised position.

12. An apparatus as claimed in claim 1, which comprises roller means for supporting said bottom rails on said bed rails and for permitting railing of said bottom rails with respect to said bed rails.

13. An apparatus as claimed in claim 1, which comprises a plurality of lift arms interconnecting said top rails to said bottom rails.

14. A method of elevating a canopy on a support, which comprises:
   mounting bed rails on the support;
   mounting bottom rails on the bed rails;
   mounting top rails on the bottom rails;
   mounting said canopy to said top rails;
   railing the bottom and top rails together toward a rear portion of the support; and
   lifting said top rails and canopy together from said bottom rails such that said canopy is elevated from said support.

15. A method as claimed in claim 14, which comprises locking said bottom rails and bed rails from respective railing movement therebetween before lifting said top rails and canopy.

16. A method as claimed in claim 14, which comprises railing said top rails and canopy together toward a cab portion of the support after lifting said top rails and canopy and locking the top and bottom rails with respect to said bed rails for preventing further railing movement therebetween.

* * * * *